(12) United States Patent
Line et al.

(10) Patent No.: US 9,016,784 B2
(45) Date of Patent: Apr. 28, 2015

(54) THIN SEAT LEG SUPPORT SYSTEM AND SUSPENSION

(71) Applicant: Ford Global Technologies, LLC, Dearborn, MI (US)

(72) Inventors: Johnathan Andrew Line, Northville, MI (US); Daniel Ferretti, Commerce Township, MI (US); John W. Jaranson, Dearborn, MI (US); Grant A. Compton, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 13/748,857

(22) Filed: Jan. 24, 2013

(65) Prior Publication Data
US 2014/0203607 A1 Jul. 24, 2014

(51) Int. Cl.
*A47C 7/14* (2006.01)
*B60N 2/02* (2006.01)

(52) U.S. Cl.
CPC .................................... *B60N 2/0284* (2013.01)

(58) Field of Classification Search
USPC .......................... 297/284.11, 284.3, 312, 337
See application file for complete search history.

(56) References Cited

U.S. PATENT DOCUMENTS

| 2,958,369 | A | | 11/1960 | Pitts et al. | |
|---|---|---|---|---|---|
| 3,403,938 | A | | 10/1968 | Cramer et al. | |
| 3,792,897 | A | * | 2/1974 | Alson | 297/219.1 |
| 3,929,374 | A | | 12/1975 | Hogan et al. | |
| 4,324,431 | A | | 4/1982 | Murphy et al. | |
| 4,334,709 | A | | 6/1982 | Akiyama et al. | |
| 4,353,595 | A | | 10/1982 | Kaneko et al. | |
| 4,452,485 | A | * | 6/1984 | Schuster | 297/284.4 |
| 4,541,669 | A | | 9/1985 | Goldner | |
| 4,629,248 | A | | 12/1986 | Mawbey | |
| 4,720,141 | A | | 1/1988 | Sakamoto et al. | |
| 4,796,313 | A | * | 1/1989 | DiMatteo et al. | 5/81.1 C |
| 4,858,992 | A | * | 8/1989 | LaSota | 297/284.2 |
| 4,915,447 | A | | 4/1990 | Shovar | |
| 4,938,529 | A | * | 7/1990 | Fourrey | 297/284.9 |
| 5,050,930 | A | * | 9/1991 | Schuster et al. | 297/284.4 |

(Continued)

FOREIGN PATENT DOCUMENTS

| EP | 0754590 | 1/1997 |
|---|---|---|
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — David E Allred
(74) *Attorney, Agent, or Firm* — Vichit Chea; Price Heneveld LLP

(57) ABSTRACT

A vehicle seat assembly includes a seat defining a seating area. An internal flex member is disposed in the seat. An external flex member is proximate a forward edge of the seat. A first actuation assembly is operably coupled to the internal flex member to raise a portion of the seat. A second actuation assembly translates the external flex member between a retracted position and an extended position that enlarges the effective seating area.

20 Claims, 14 Drawing Sheets

(56) References Cited

U.S. PATENT DOCUMENTS

| | | | |
|---|---|---|---|
| 5,171,062 A | 12/1992 | Courtois | |
| 5,174,526 A | 12/1992 | Kanigowski | |
| 5,518,294 A | 5/1996 | Ligon, Sr. et al. | |
| 5,560,681 A | 10/1996 | Dixon et al. | |
| 5,588,708 A * | 12/1996 | Rykken et al. | 297/423.2 |
| 5,609,394 A * | 3/1997 | Ligon et al. | 297/284.4 |
| 5,647,635 A | 7/1997 | Aumond et al. | |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,951,039 A | 9/1999 | Severinski et al. | |
| 6,024,406 A | 2/2000 | Charras et al. | |
| 6,062,642 A | 5/2000 | Sinnhuber et al. | |
| 6,145,925 A | 11/2000 | Eksin et al. | |
| 6,155,593 A | 12/2000 | Kimura et al. | |
| 6,161,231 A * | 12/2000 | Kraft et al. | 5/18.1 |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,398,306 B1 * | 6/2002 | Mack | 297/337 |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,344,189 B2 | 3/2008 | Reed et al. | |
| 7,350,859 B2 | 4/2008 | Klukowski | |
| 7,357,454 B2 * | 4/2008 | Schiener et al. | 297/284.9 |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,562,934 B2 * | 7/2009 | Swan et al. | 297/284.1 |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 2004/0108760 A1 * | 6/2004 | McMillen | 297/284.4 |
| 2004/0195870 A1 | 10/2004 | Bohlender et al. | |
| 2005/0179287 A1 * | 8/2005 | Hankins | 297/219.11 |
| 2005/0200166 A1 | 9/2005 | Noh | |
| 2006/0043777 A1 | 3/2006 | Friedman et al. | |
| 2007/0120401 A1 | 5/2007 | Minuth et al. | |
| 2008/0157577 A1 * | 7/2008 | Lindsay | 297/284.11 |
| 2008/0174159 A1 | 7/2008 | Kojima et al. | |
| 2009/0066122 A1 | 3/2009 | Minuth et al. | |
| 2009/0322124 A1 | 12/2009 | Barkow et al. | |
| 2010/0038937 A1 | 2/2010 | Andersson et al. | |
| 2010/0140986 A1 | 6/2010 | Sawada | |
| 2010/0187881 A1 | 7/2010 | Fujita et al. | |
| 2010/0201167 A1 | 8/2010 | Wieclawski | |
| 2010/0231013 A1 | 9/2010 | Schlenker | |
| 2010/0270840 A1 | 10/2010 | Tanaka et al. | |
| 2010/0301650 A1 | 12/2010 | Hong | |
| 2010/0320816 A1 | 12/2010 | Michalak | |
| 2011/0018498 A1 | 1/2011 | Soar | |
| 2011/0074185 A1 | 3/2011 | Nakaya et al. | |
| 2011/0095513 A1 | 4/2011 | Tracht et al. | |
| 2011/0095578 A1 | 4/2011 | Festag | |
| 2011/0109127 A1 | 5/2011 | Park et al. | |
| 2011/0109128 A1 | 5/2011 | Axakov et al. | |
| 2011/0133525 A1 | 6/2011 | Oota | |
| 2011/0163574 A1 | 7/2011 | Tame et al. | |
| 2011/0163583 A1 | 7/2011 | Zhong et al. | |
| 2011/0186560 A1 | 8/2011 | Kennedy et al. | |
| 2011/0187174 A1 | 8/2011 | Tscherbner | |
| 2011/0254335 A1 | 10/2011 | Pradier et al. | |
| 2011/0260506 A1 | 10/2011 | Kuno | |
| 2011/0272548 A1 | 11/2011 | Rudkowski et al. | |
| 2011/0272978 A1 | 11/2011 | Nitsuma | |
| 2011/0278885 A1 | 11/2011 | Procter et al. | |
| 2011/0278886 A1 | 11/2011 | Nitsuma | |

(56) References Cited

U.S. PATENT DOCUMENTS

| | | |
|---|---|---|
| 2011/0298261 A1 | 12/2011 | Holt et al. |
| 2012/0013161 A1* | 1/2012 | Adams et al. ............... 297/284.2 |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2014/0167465 A1* | 6/2014 | SAKATA et al. ........ 297/284.11 |

FOREIGN PATENT DOCUMENTS

| | | | |
|---|---|---|---|
| EP | 1266794 | 3/2004 | |
| EP | 1123834 | 10/2004 | |
| EP | 1050429 | 10/2005 | |
| EP | 1084901 | 6/2006 | |
| EP | 1674333 | 8/2007 | |
| EP | 1950085 | 12/2008 | |
| EP | 1329356 | 11/2009 | |
| JP | 61036029 A * | 2/1986 | ............... B60N 1/06 |
| WO | WO9511818 | 5/1995 | |
| WO | WO9958022 | 11/1999 | |
| WO | WO2006131189 | 12/2006 | |
| WO | WO2007028015 | 8/2007 | |
| WO | WO2008073285 | 6/2008 | |
| WO | WO2011021952 | 2/2011 | |
| WO | WO2012008904 | 1/2012 | |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.COM, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

* cited by examiner

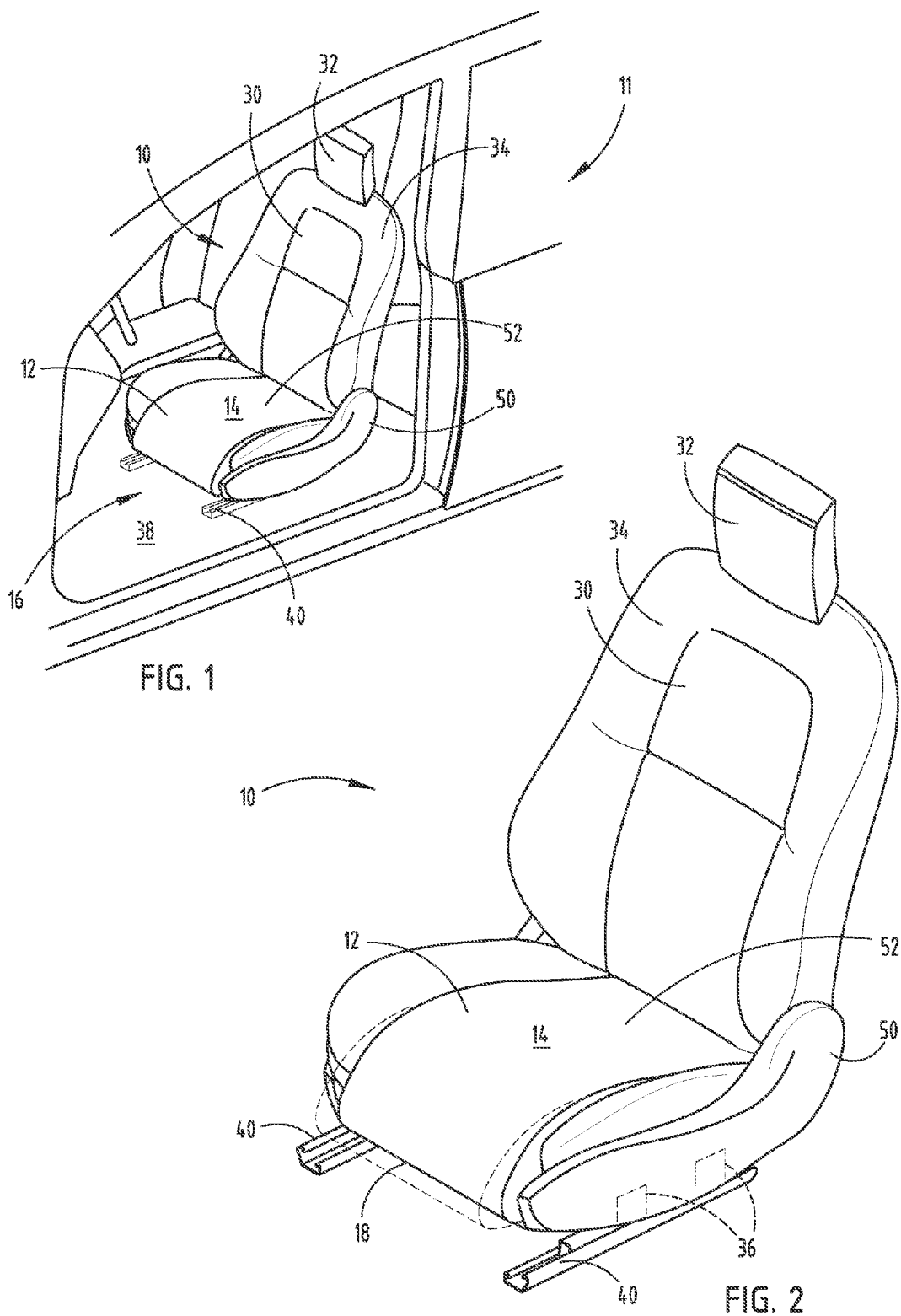

US 9,016,784 B2

THIN SEAT LEG SUPPORT SYSTEM AND SUSPENSION

FIELD OF THE INVENTION

The present invention generally relates to a vehicle seat assembly, and more particularly to a seat extension assembly with a thin seat leg support system and suspension.

BACKGROUND OF THE INVENTION

Modern vehicle seats are becoming more and more comfortable as our understanding of human ergonomics, posture, and comfortability increases. Vehicle seating assemblies that include comfort components in the vehicle seat back and the vehicle seat can provide drivers and passengers with improved comfort and increased endurance for extensive vehicle rides. Additionally, accommodating the various sizes, shapes, and desired sitting style of drivers and passengers can prove challenging when providing vehicle seating assemblies. Accordingly, vehicle seating assemblies that include components to accommodate the different sizes and shapes of drivers and passengers, as well as the desired posture and sitting positions of those drivers and passengers, has become increasingly important.

SUMMARY OF THE INVENTION

According to one aspect of the present invention, a vehicle seat assembly includes a seat defining a seating area. An internal flex member is disposed in the seat. An external flex member is proximate a forward edge of the seat. A first actuation assembly is operably coupled to the internal flex member to raise a portion of the seat. A second actuation assembly translates the external flex member between a retracted position and an extended position that enlarges the effective seating area.

According to another aspect of the present invention, a vehicle seat assembly includes a seat. An internal flex member includes an arcuate cross-section and is wrapped around a first roller in the seat. The internal flex member can be unwrapped to raise a portion of the seat. An external flex member includes an arcuate cross-section and is wrapped around a second roller in the seat. The external flex member can be unwrapped to enlarge an effective seating area of the seat.

According to yet another aspect of the present invention, a seat extension assembly includes a seat defining a seating area and an actuation assembly. First and second elongate flexible elements are at least partially wrapped on first and second rollers, respectively. The first elongate flexible element is configured to unwrap from the first roller and raise a portion of the seat. The second elongate flexible element is configured to unwrap from the second roller and enlarge the effective seating area of the seat.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a top perspective view of one embodiment of a vehicle seating assembly of the present invention;

FIG. 2 is a top perspective view of the vehicle seating assembly of FIG. 1;

DETAILED DESCRIPTION OF THE EMBODIMENTS

Figure 3:
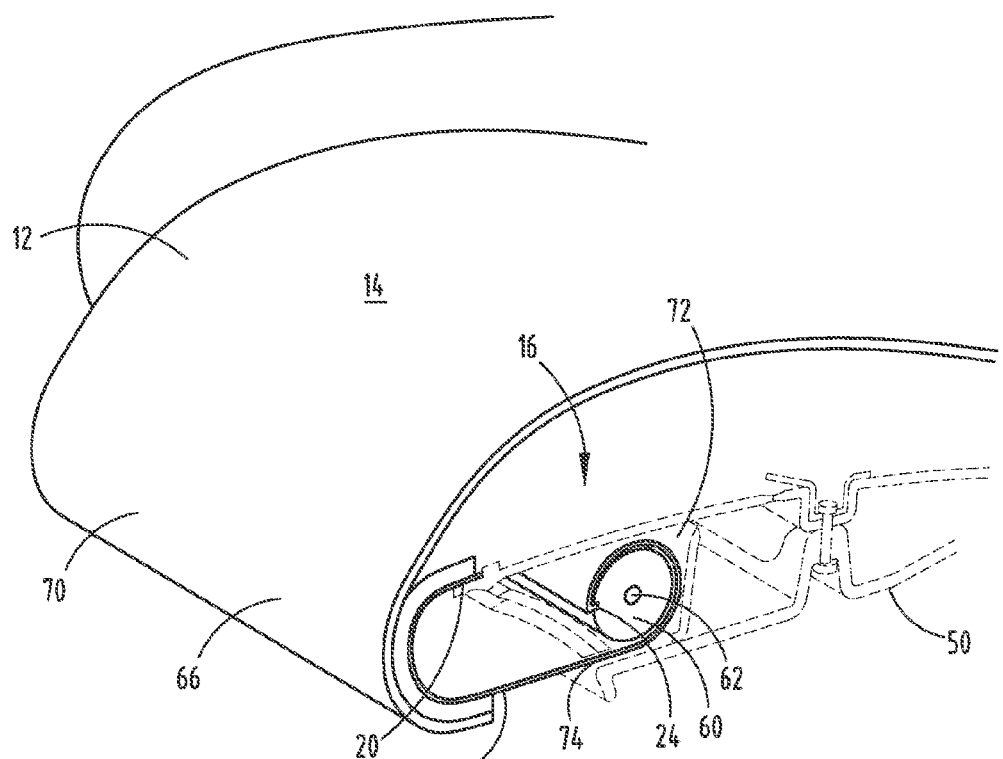
FIG. 3 is a top perspective view of one embodiment of a forward portion of a vehicle seating assembly of the present invention in a retracted position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-3A, reference numeral 10 generally designates a vehicle seating assembly for use in a vehicle 11 that includes a seat 12 defining a seating area 14 and an actuation assembly 16. An elongate flexible member 18 includes a first end 20 coupled to the seat 12 and a second end 24 operably coupled with the actuation assembly 16. The elongate flexible member 18 is pivotally moveable between a raised position and a lowered position (FIGS. 10-11) and operable between a retracted position and an extended position (FIGS. 3-9A). The elongate flexible member 18 is configured to enlarge the effective seating area 14.

Referring again to FIGS. 1 and 2, the vehicle seating assembly 10 generally includes a seat back 30 pivotally coupled to the seat 12 and operable between upright and reclined positions. The seat back 30 includes a headrest 32 extending from a top portion 34 thereof and configured to support the head of a driver or a passenger in the vehicle 11. The seat 12 may be positioned on legs 36 that are operably coupled with a floor 38 of the vehicle 11. In the illustrated embodiment of FIGS. 1 and 2, the legs 36 are coupled with a slide assembly 40 that allows for fore and aft translation of the vehicle seating assembly 10 to a variety of positions to accommodate varying sizes of drivers and passengers.

Referring again to FIGS. 3 and 3A, one embodiment of the present invention includes a seat frame 50 coupled to the legs 36. The seat frame 50 supports the seat 12, which defines the seating area 14. The seating area 14 is configured to be enlarged by the driver or passenger to accommodate the underside of the legs of a driver or a passenger near the underside of the knees. The elongate flexible member 18 is coupled to the seat 12 and abuts a forward portion of a seat base 52 that extends behind the elongate flexible member 18 proximate the seat back 30. The first end 20 of the elongate flexible member 18 is fixedly or pivotally coupled to the seat 12. The second end 24 of the elongate flexible member 18 is operably coupled to the actuation assembly 16. The actuation assembly 16 can be any of a variety of devices, as outlined in further detail below.

Figure 3A:
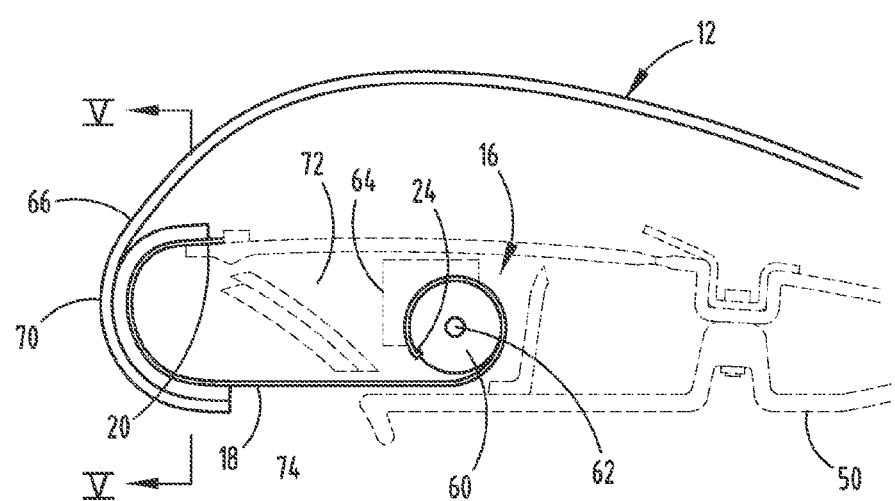
FIG. 3A is a side elevational view of the forward portion of the vehicle seating assembly of FIG. 3 in the retracted position.

In the illustrated embodiment of FIGS. 3 and 3A, the actuation assembly 16 includes a roller 60 disposed below the seating area 14 in the seat 12 that is operably coupled with a drive shaft 62. The drive shaft 62 is coupled to a motor 64 that is activatable by the driver or passenger sitting on the seat 12. In the illustrated embodiment, the elongate flexible member 18 is operable between the retracted position and the extended position. In the extended position, the elongate flexible member 18 enlarges the effective seating area 14. The elongate flexible member 18 is illustrated in the refracted position in both FIGS. 3 and 3A. It is also contemplated that the elongate flexible member 18 may be pivotally moveable between raised and lower positions at a forward portion 66 of the seat 12. Specifically, the forward portion 66 of the seat 12 may be pivotally rotated upward such that the elongate flexible member 18 is pivotally moveable between raised and lowered positions, as disclosed further below. The movement of the elongate flexible member 18 between raised and lowered positions can be made regardless of the retracted or extended position of the elongate flexible member 18. Accordingly, the vehicle seating assembly 10 has exceptional versatility, thereby providing comfort to the driver or passenger.

Figure 4:
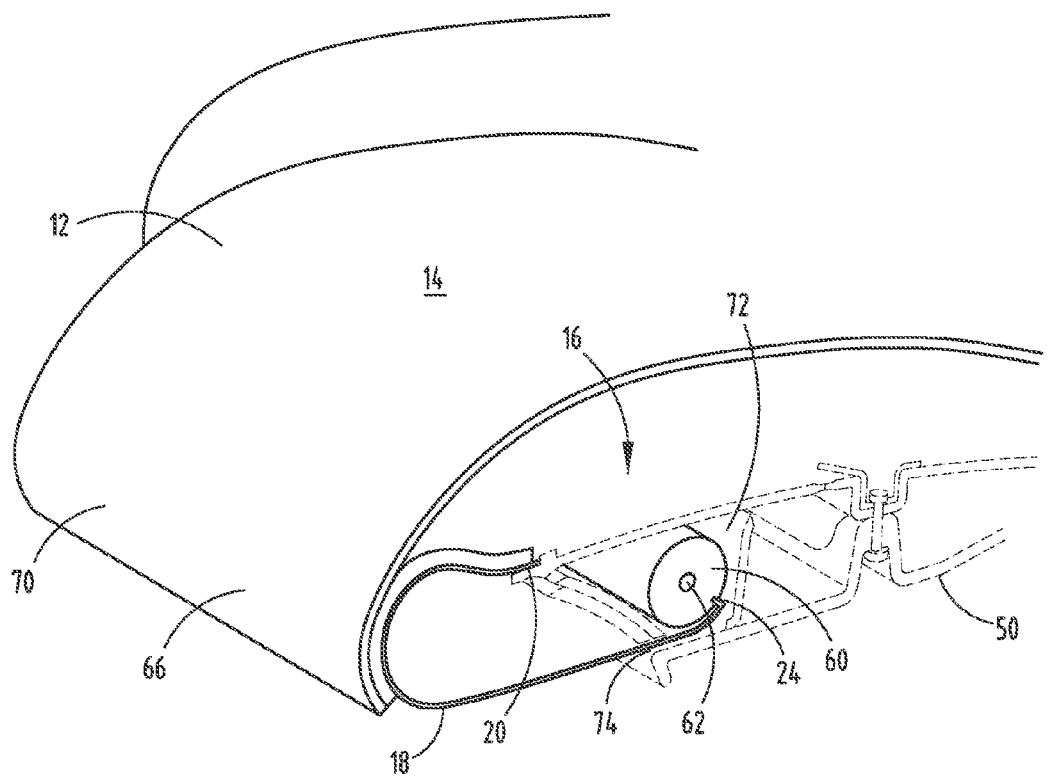
FIG. 4 is a top perspective view of one embodiment of a forward portion of a vehicle seating assembly of the present invention in an extended position.
Figure 4A:
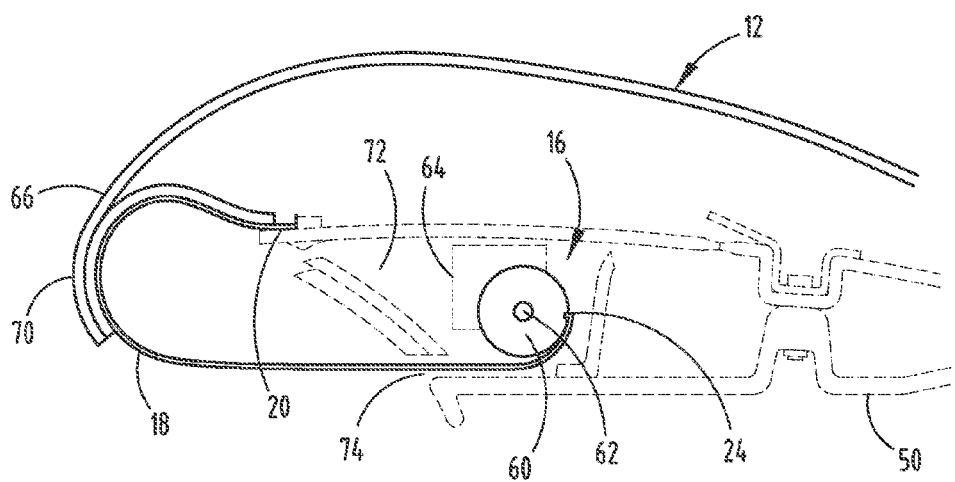
FIG. 4A is a side elevational view of the forward portion of the vehicle seating assembly of FIG. 4 in the extended position.

As shown in FIGS. 4 and 4A, the elongate flexible member 18 is configured to be extended such that the forward portion 66 of the seat 12 is extended. As the forward portion 66 of the seat 12 extends, the effective seating area 14 of the seat 12 is enlarged. The elongate flexible member 18 is constructed to provide substantial support to the underside of the legs of the driver or passenger, while also providing flexibility to give a comfortable seating experience. It is contemplated that the motor 64 can be activated such that the roller 60 only rotates a minimal amount. Accordingly, the elongate flexible member 18 can be extended to a variety of positions forward of the seat 12. A coverstock 70 is positioned over the forward portion 66 of the seat 12 and the elongate flexible member 18 to provide an aesthetically pleasing appearance to the consumer and also to protect the elongate flexible member 18 as the elongate flexible member 18 moves from the retracted position to the extended position and from the lowered position to the raised position. Additionally, the forward portion 66 of the seat 12 includes a recess 72 generally designed to accommodate the motor 64 and the roller 60 therein. A forward slot 74 in the seat 12 allows for the elongate flexible member 18 to extend through the slot 74 and be retracted into the slot 74 during activation of the actuation assembly 16. Additionally, the elongate flexible member 18 may include a narrow rear portion (near the seat base 52) and a wide forward portion 66. This configuration helps provide a larger forward portion 66 of the seat 12 to accommodate drivers and passengers having different sized legs.

Figure 5:
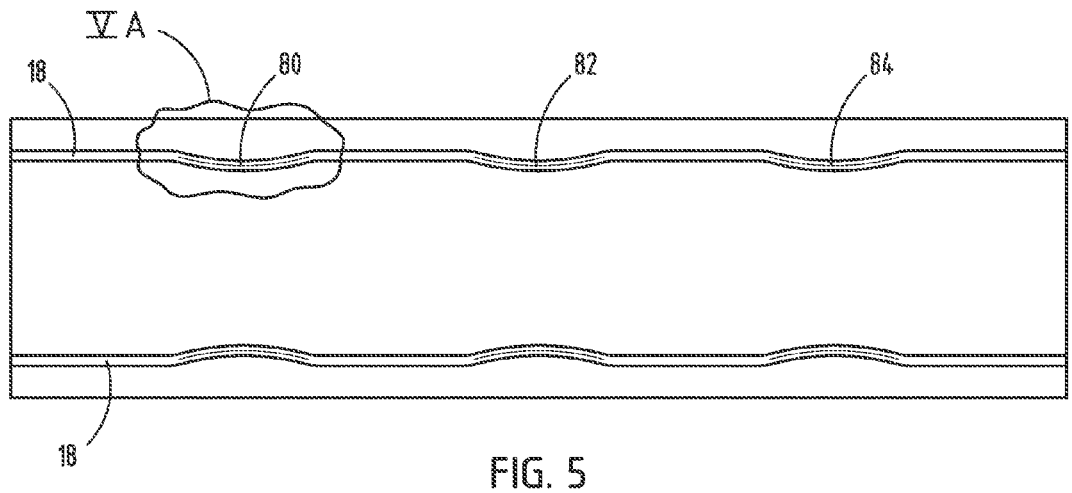
FIG. 5 is a front cross-sectional view taken at line V-V of FIG. 3A.
Figure 5A:
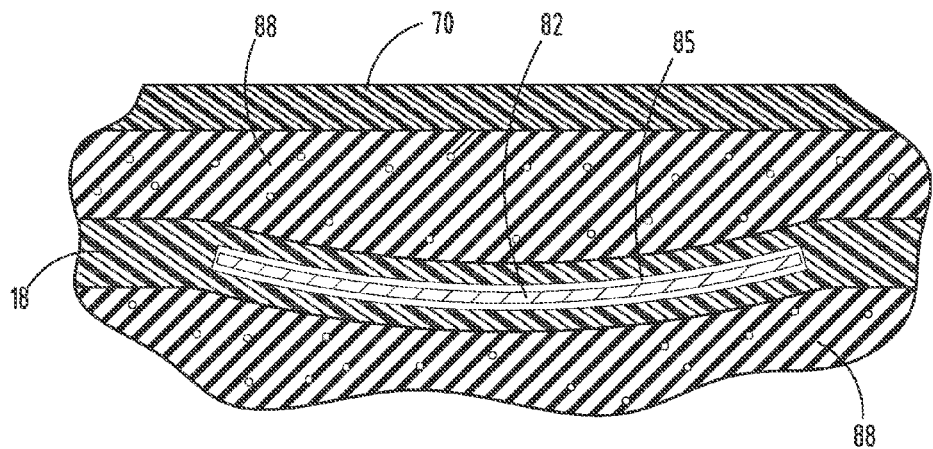
FIG. 5A is a front elevational cross-sectional view of area VA of FIG. 5.

With reference now to FIGS. 5 and 5A, the illustrated embodiment shows the elongate flexible member 18 having first, second, and third elongate flexible elements 80, 82, 84 that have a substantially arcuate cross-section. The arcuate cross-section gives the elongate flexible elements 80, 82, 84 increased load bearing capacity as the elongate flexible member 18 transitions between the retracted and extended positions than if the elongate flexible elements 80, 82, 84 had a planar cross-section. It is also contemplated that the elongate flexible member 18 may have only one or only two elongate flexible elements. As noted above, three elongate flexible elements 80, 82, 84 are illustrated. However, it is also contemplated that two elongate flexible elements may be present and disposed in the seat 12 substantially below the likely position of the legs of the driver or passenger.

The embodiment of FIG. 5 illustrates the elongate flexible element 80 disposed on an inboard position in the seat 12, the elongate flexible element 82 in the middle of the seat 12, and the elongate flexible element 84 at an outboard position of the seat 12. These positions correspond with the elongate flexible element 80 being disposed at an inboard position of the legs of the driver or passenger, the elongate flexible element 82 being disposed at an intermediate position between the legs of the driver or passenger, and the elongate flexible element 84 being disposed at an outboard position of the legs of the driver or passenger. As shown in FIG. 5A, each elongate flexible element 80, 82, 84 is disposed in the elongate flexible member 18, surrounded by a foam 88 or other cushion support of the seat 12. The coverstock 70 is positioned over the foam 88. A top portion and a bottom portion of the elongate flexible elements 80, 82, 84 are covered and connected by the coverstock 70. The coverstock 70 may cover all or a substantial portion of the elongate flexible elements 80, 82, 84. It is also contemplated that the elongate flexible elements 80, 82, 84 may include a substantially planar cross-section and move through feeder channels 85 that allow smooth continuous movement of the elongate flexible elements 80, 82, 84 as the seat 12 moves to the extended and refracted positions. In this instance, the elongate flexible elements 80, 82, 84 will likely include a thicker cross-section as the overall strength and rigidity of the elongate flexible elements 80, 82, 84 may lessen by not including an arcuate cross-section. It is contemplated regardless of the configuration of the cross-section of the elongate flexible elements 80, 82, 84 that the materials from which the elongate flexible elements 80, 82, 84 are made can be a metal, a polymer, etc. Although shown in the embodiment of FIGS. 3-4A, the aforementioned configurations of the elongate flexible member 18 and the elongate flexible elements 80, 82, 84 may be utilized in any of the embodiments disclosed herein.

Figure 6:
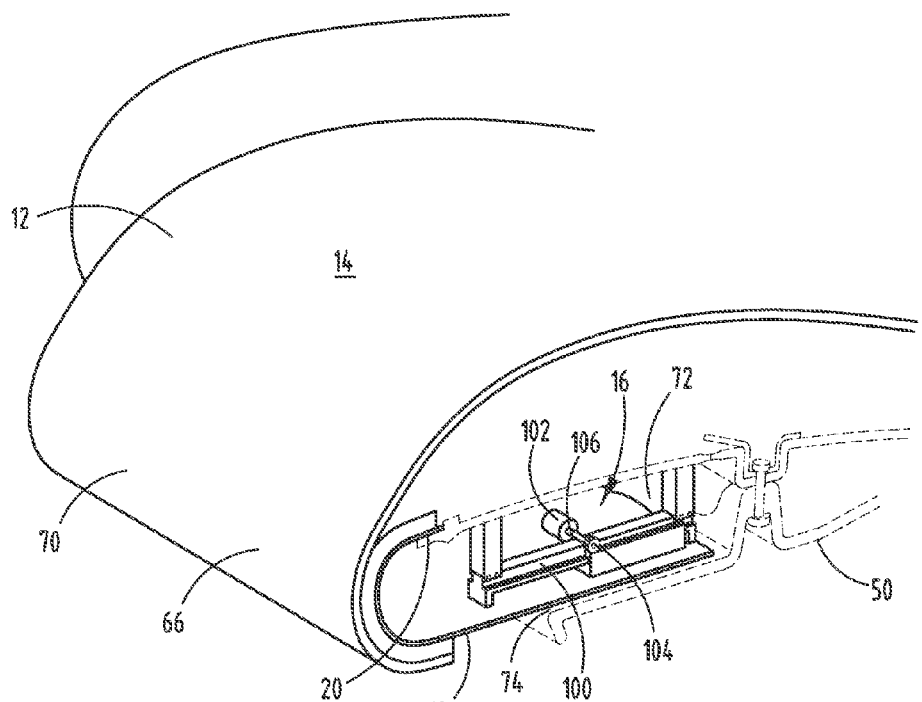
FIG. 6 is a top perspective view of another embodiment of a forward portion of a vehicle seating assembly of the present invention in a retracted position.
Figure 6A:
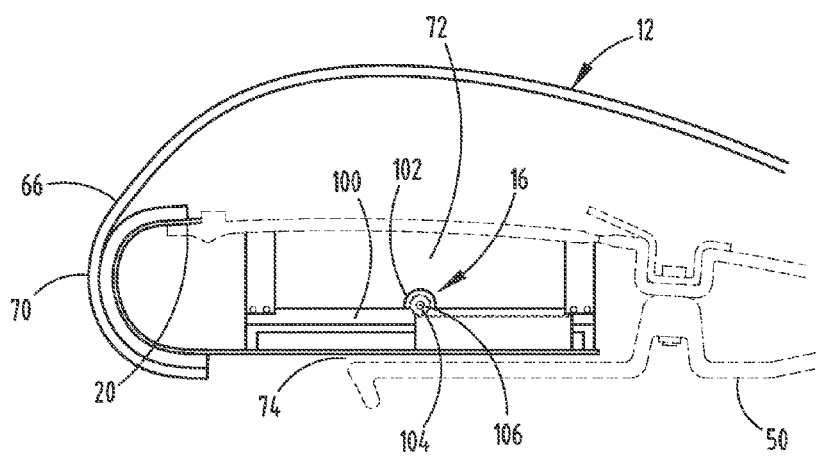
FIG. 6A is a side elevational view of the forward portion of the vehicle seating assembly of FIG. 6 in the retracted position.
Figure 7:
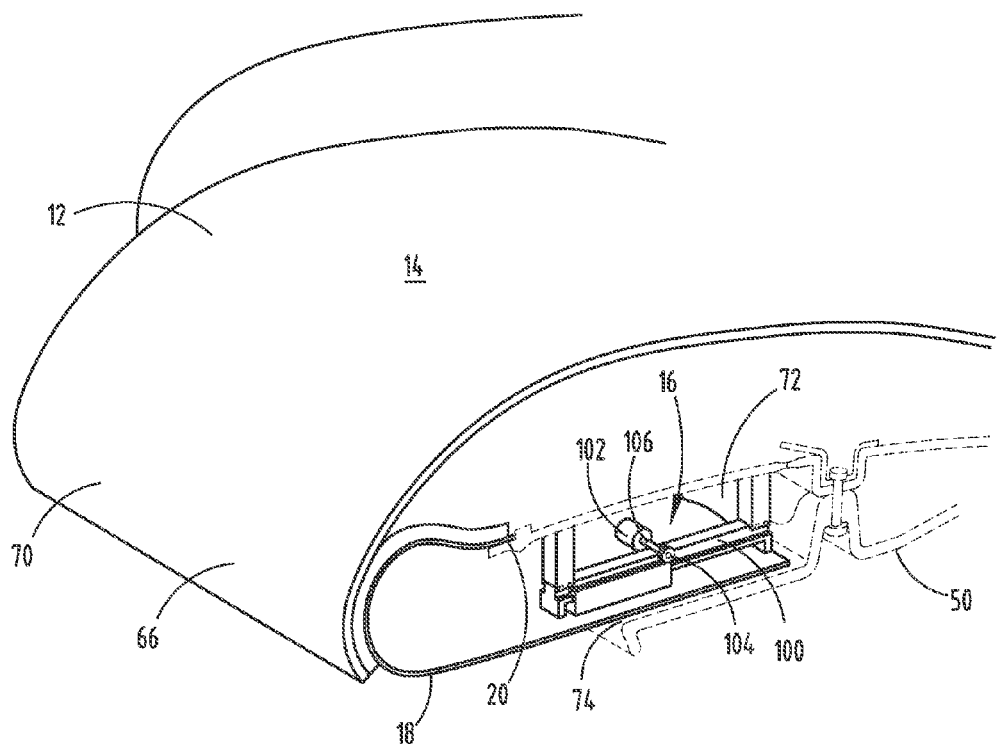
FIG. 7 is a top perspective view of another embodiment of a forward portion of a vehicle seating assembly of the present invention in an extended position.
Figure 7A:
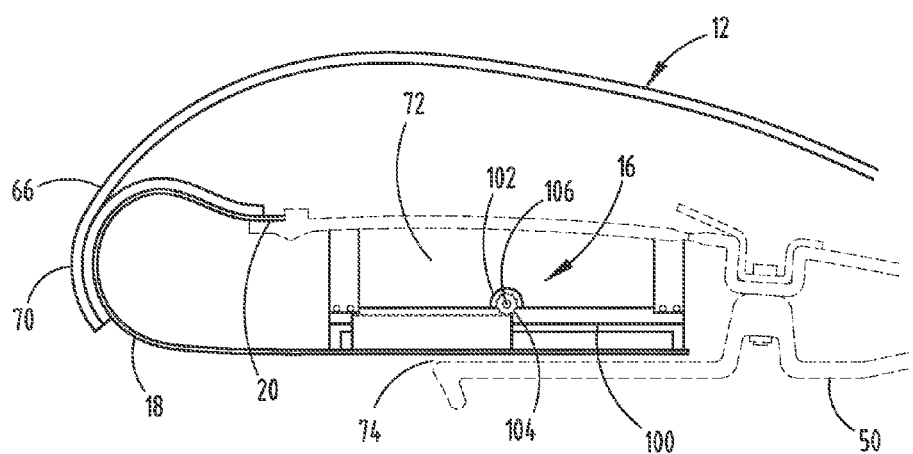
FIG. 7A is a side elevational view of the forward portion of the vehicle seating assembly of FIG. 7 in the extended position.

Referring now to FIGS. 6-7A, another embodiment of the vehicle seating assembly 10 is illustrated that includes a gear assembly 100. The gear assembly 100 is configured to move the elongate flexible member 18 between the retracted and extended positions to enlarge the effective seating area 14 of the seat 12. The vehicle seating assembly 10 of FIGS. 6-7A functions in much the same way as the vehicle seating assembly 10 described earlier with reference to FIGS. 3-4A. However, the embodiment illustrated in FIGS. 6-7A includes a motor 102 that is operably coupled to a gear 104 that rotates on a drive shaft 106. The gear 104 is in engagement with a slidable toothed member 107 that translates fore and aft and is operably coupled to the second end 24 of the elongate flexible member 18. As the second end 24 of the elongate flexible member 18 is forced outward, the effective seating area 14 increases. When the direction of the gear 104 is reversed, the second end 24 of the elongate flexible member 18 is drawn into the seat frame 50, thereby reducing the effective seating area 14 of the seat 12.

Figure 8:
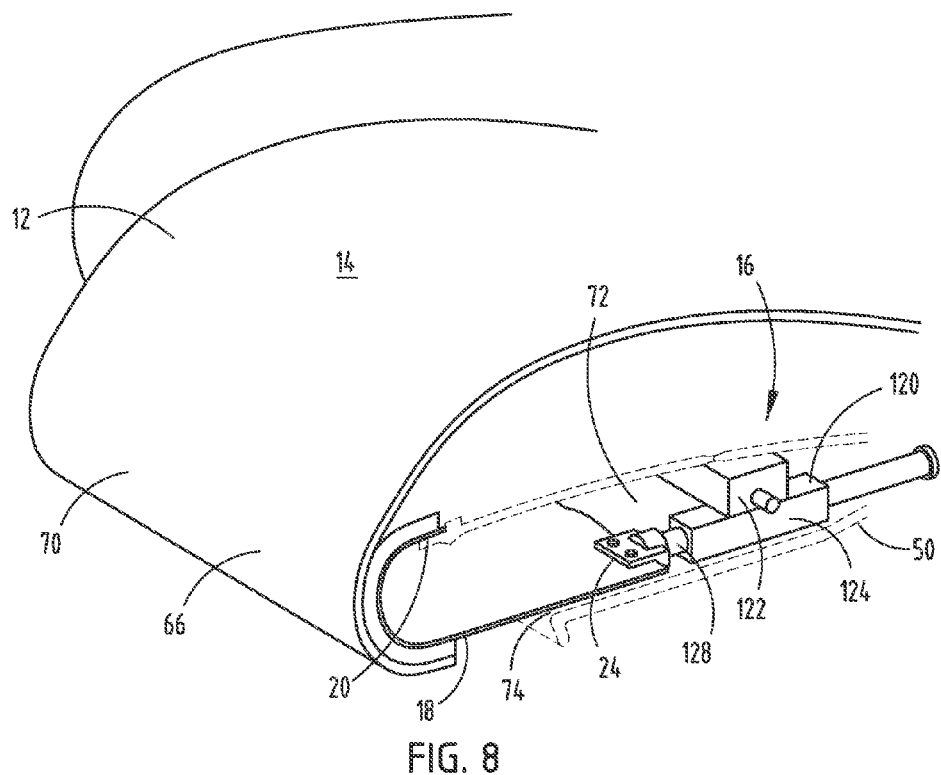
FIG. 8 is a top perspective view of another embodiment of a forward portion of a vehicle seating assembly of the present invention in a retracted position.
Figure 8A:
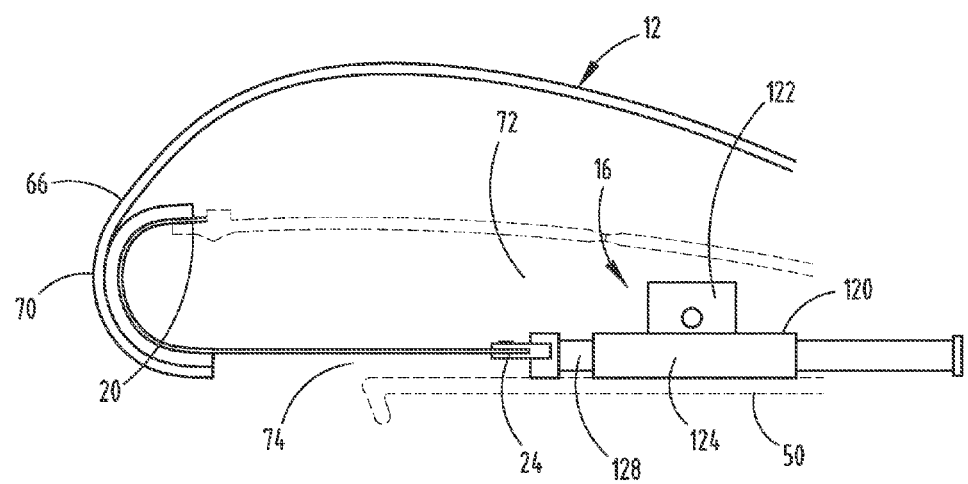
FIG. 8A is a side elevational view of the forward portion of the vehicle seating assembly of FIG. 8 in the retracted position.
Figure 9:
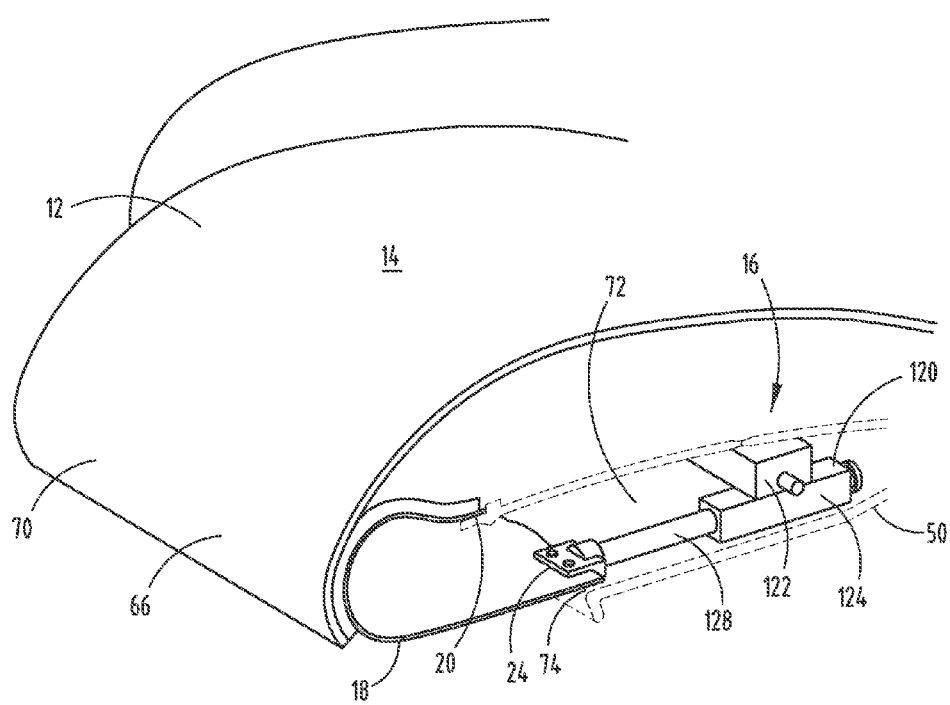
FIG. 9 is a top perspective view of another embodiment of a forward portion of a vehicle seating assembly of the present invention in an extended position.
Figure 9A:
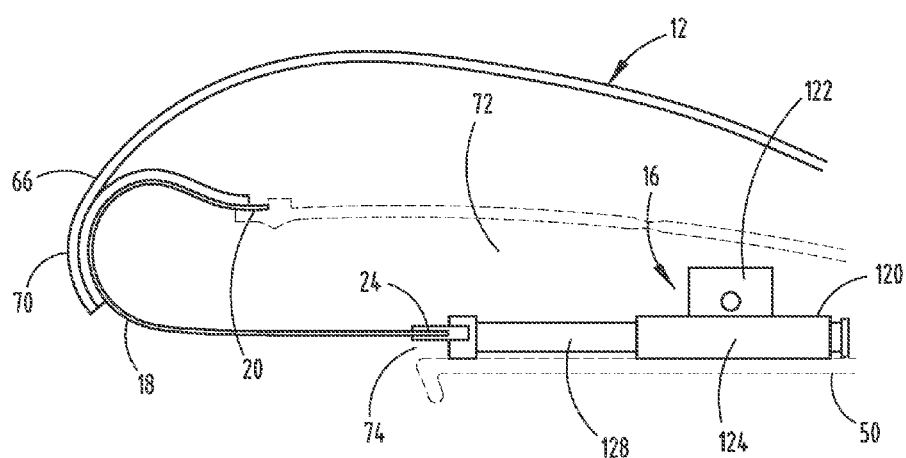
FIG. 9A is a side elevational view of the forward portion of the vehicle seating assembly of FIG. 9 in the extended position.

Referring now to FIGS. 8-9A, another embodiment of the vehicle seating assembly 10 is illustrated that includes one of a pneumatic cylinder and a hydraulic cylinder 120. The pneumatic or hydraulic cylinder 120 is configured to move the elongate flexible member 18 between the non-deployed and deployed positions that correspond with the retracted and extended positions of the seat 12. The vehicle seating assembly 10 of FIGS. 8-9A functions in much the same way as the vehicle seating assembly 10 described earlier with reference to FIGS. 3-4A and 6-7A. However, the embodiment illustrated in FIGS. 8-9A includes a motor 122 that is operably coupled to a pump 124 that pushes air to the pneumatic cylinder 120, which extends a drive shaft 128 operably coupled to the second end 24 of the elongate flexible member 18. The air for the pneumatic cylinder 120 may be ambient air or a stored air. As the second end 24 of the elongate flexible member 18 is forced outward, the effective seating area 14 increases. Similarly, when the air is withdrawn from the pneumatic cylinder 120, the second end 24 of the elongate flexible member 18 is drawn into the seat frame 50, thereby reducing the effective seating area 14 of the seat 12. In the event a hydraulic system is utilized, then a hydraulic fluid is pumped by the pump 124 by way of the motor 122. The hydraulic fluid forces the drive shaft 128, which is operably coupled to the second end 24 of the elongate flexible member 18, to an outward position. The hydraulic fluid for the hydraulic cylinder 120 would be stored in a hydraulic fluid container. As the second end 24 of the elongate flexible member 18 is forced outward, the effective seating area 14 increases. When the hydraulic fluid is withdrawn from the hydraulic cylinder 120, the second end 24 of the elongate flexible member 18 is drawn into the seat frame 50 to reduce the effective seating area 14 of the seat 12.

Figure 10:
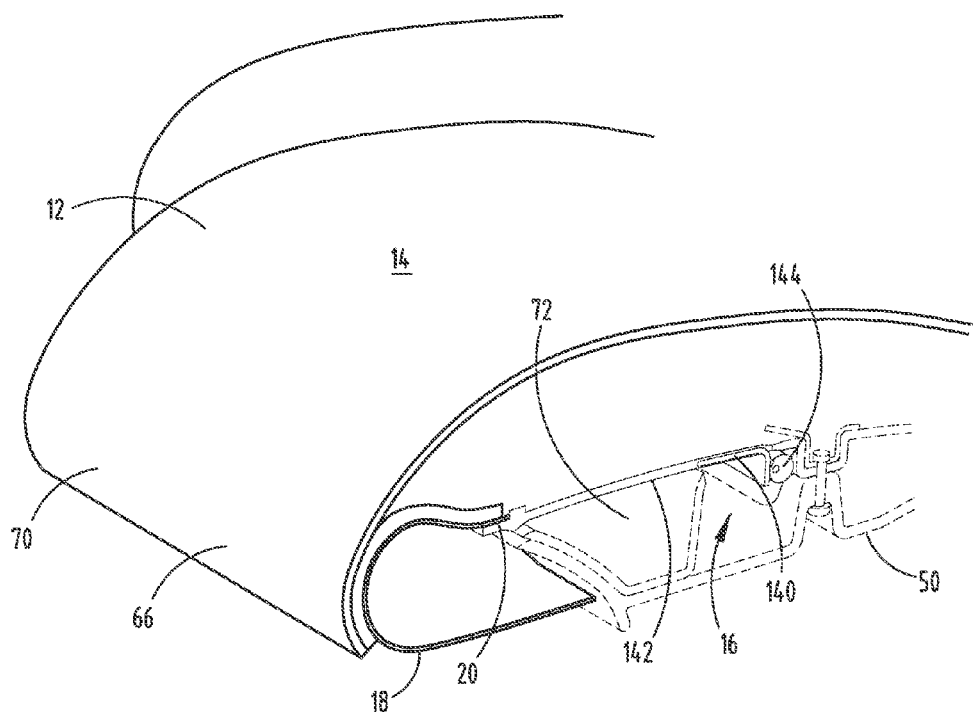
FIG. 10 is a top perspective view of another embodiment of a forward portion of a vehicle seating assembly of the present invention in a retracted position.
Figure 10A:
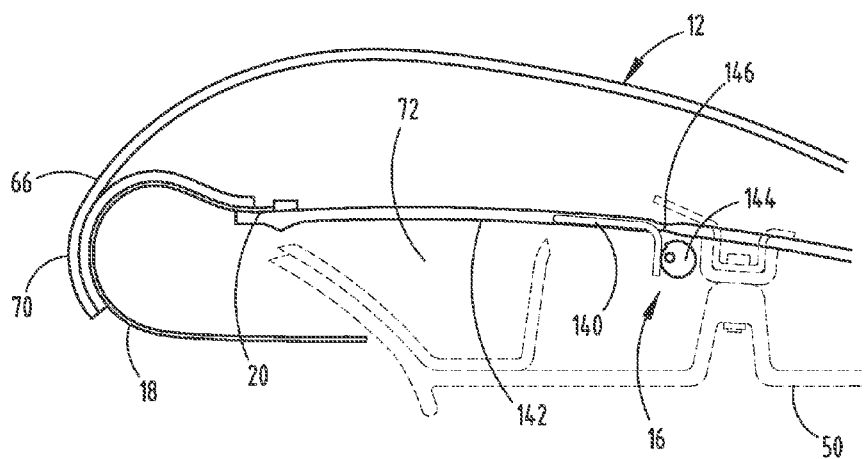
FIG. 10A is a side elevational view of the forward portion of the vehicle seating assembly of FIG. 10 in the retracted position.
Figure 11:
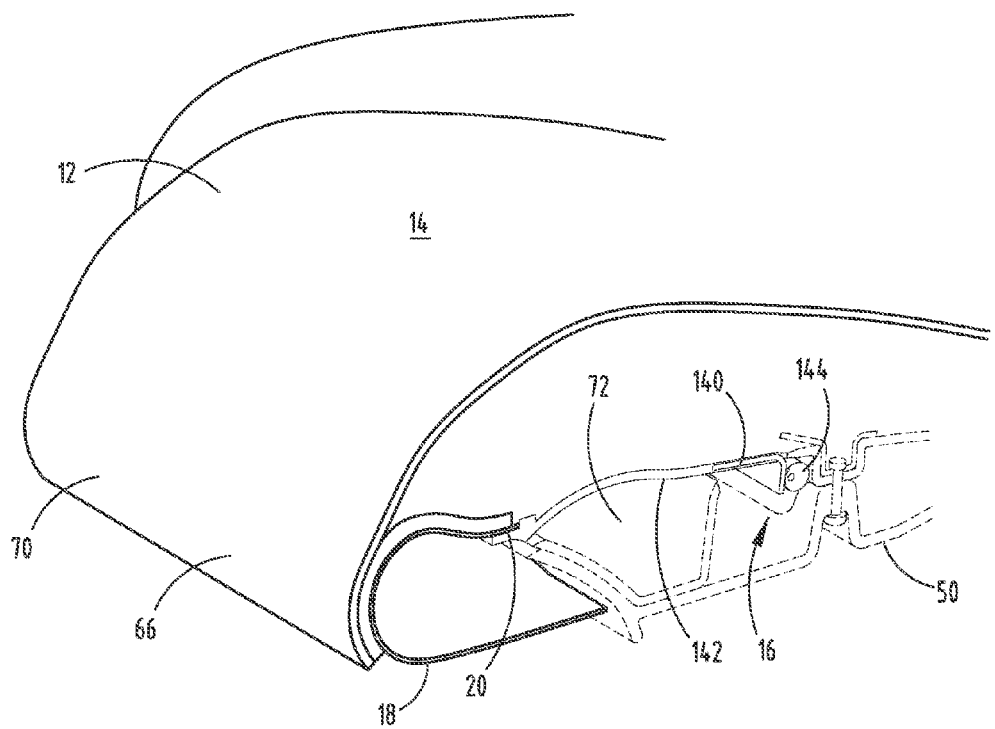
FIG. 11 is a top perspective view of another embodiment of a forward portion of a vehicle seating assembly of the present invention in an extended position.
Figure 11A:
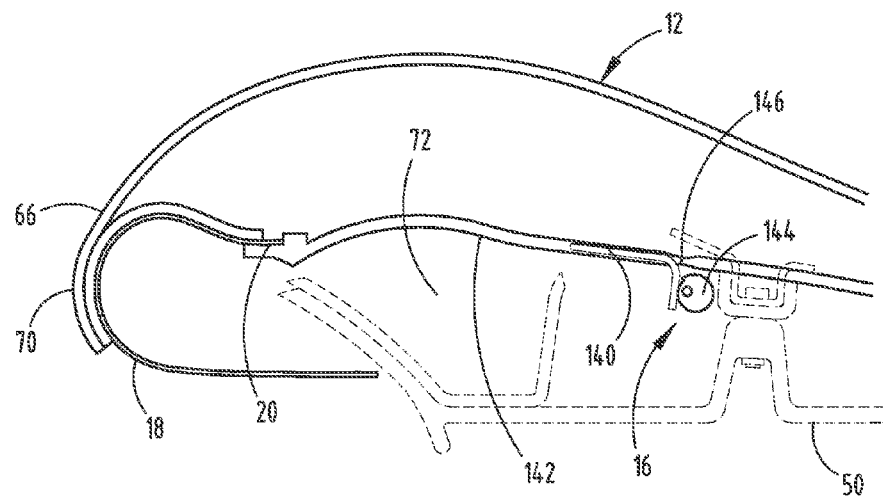
FIG. 11A is a side elevational view of the forward portion of the vehicle seating assembly of FIG. 11 in the extended position.

Referring now to FIGS. 10-11A, yet another embodiment of the present invention includes the vehicle seating assembly 10 having a lift bracket 140 configured to raise a portion of the seat frame 50. Specifically, the lift bracket 140 is operably coupled with a lateral support member 142 that extends forward in the seat base 52. The lateral support member 142 is connected with the remainder of the seat frame 50 by a living hinge 146 proximate the lift bracket 140. The lift bracket 140 is connected to and rotated by a motor 144 to raise and lower the lateral support member 142 to provide additional support to the legs of a driver or a passenger. As shown in FIGS. 10 and 10A, the elongate flexible member 18 is in the extended position. It is contemplated that the elongate flexible member 18 may be moved to the extended position or the retracted position by any of the devices disclosed above with reference to FIGS. 3-9A. After the driver or passenger has moved the elongate flexible member 18 to a desired position, additional support may be provided to the underside of the legs of the driver or passenger by automatic or manual activation of the lift bracket 140. As shown in FIGS. 10 and 10A, the lift bracket 140 is in a lowered position such that additional support is not provided to the legs of the driver or passenger.

In the illustrated embodiments depicted in FIGS. 11 and 11A, the motor 144 has been activated to rotate the lift bracket 140 clockwise. Consequently, the lateral support member 142 rotates upward, thereby flexing the lateral support member 142 upwardly. As the lateral support member 142 is flexed upwardly, so too are the cushion and coverstock 70, as is readily seen in FIGS. 11 and 11A. It is contemplated that the lift bracket 140 may be any of a variety of materials, including steel or a polymer, and that the motor 144 may be connected behind the lift bracket 140 or any of a variety of other positions relative to the lift bracket 140. It is contemplated that the lateral support member 142 may be connected to the remainder of the seat frame 50 via the living hinge 146, a piano hinge, or other hinge. The lateral support member 142 will be constructed from a flexible material that allows bending and deflection, as shown in FIGS. 11 and 11A.

Figure 12:
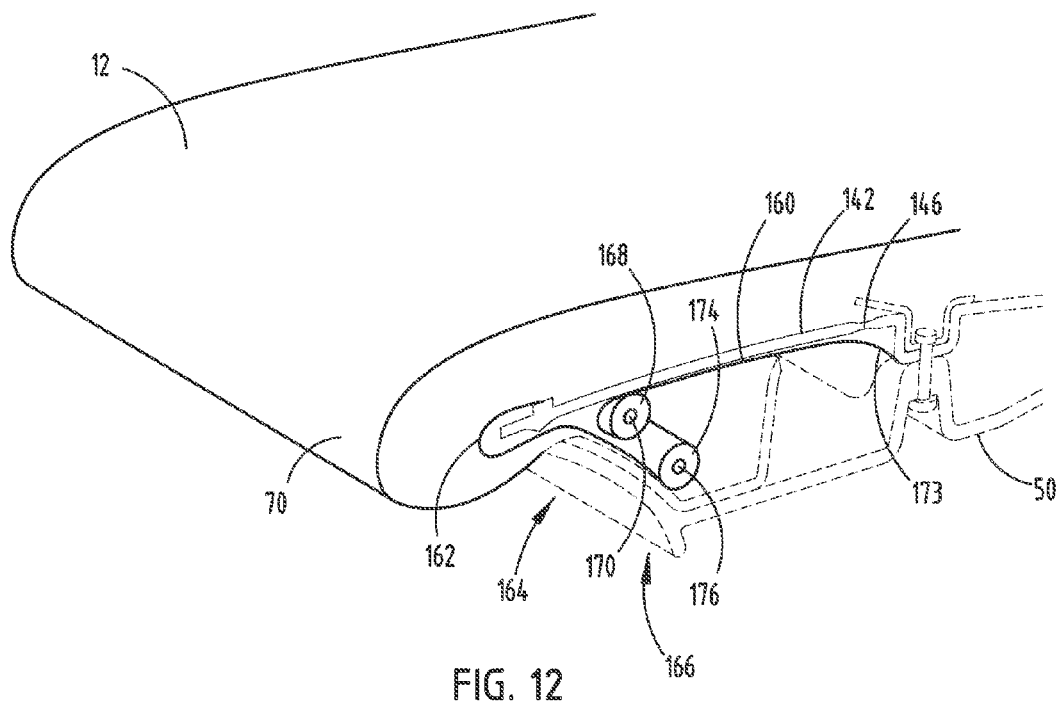
FIG. 12 is a top perspective view of another embodiment of a forward portion of a vehicle seating assembly of the present invention in a retracted position.
Figure 12A:
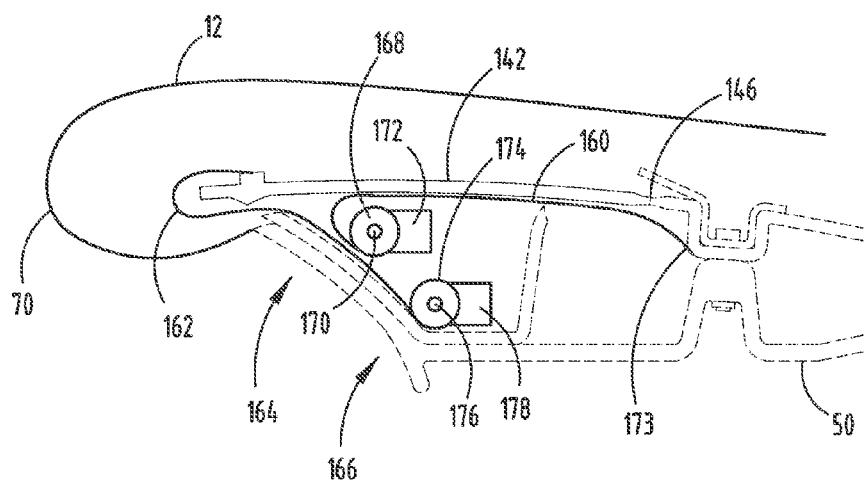
FIG. 12A is a side elevational view of the forward portion of the vehicle seating assembly of FIG. 12 in the retracted position.

Referring now to FIGS. 12 and 12A, another embodiment of a vehicle seating assembly 10 is illustrated. An internal flex member 160 is provided and disposed in the seat 12. An external flex member 162 is also provided and generally defines the forward portion 66 of the seat 12. First and second actuation assemblies 164, 166 are disposed in the seat 12. The first actuation assembly 164 is operably coupled to the internal flex member 160 and configured to raise a portion of the seat 12. In the illustrated embodiment, the first actuation assembly 164 includes a first roller 168 operably coupled to a drive shaft 170 that is coupled to a motor 172. The internal flex member 160 wraps around the first roller 168 and the motor 172 and connects with a rearward portion 173 of the seat frame 50. The second actuation assembly 166 is also disposed in the seat 12 and is configured to translate the external flex member 162 between a retracted position and an extended position that enlarges the effective seating area 14 of the seat 12. As illustrated, the second actuation assembly 166 includes a second roller 174 operably coupled to a drive shaft 176 that is coupled to a motor 178. As shown in FIGS. 12 and 12A, the vehicle seating assembly 10 is shown with the first actuation assembly 164 maintaining the internal flex member 160 in a lowered position. At the same time, the second actuation assembly 166 is maintaining the external flex member 162 in a retracted position such that the effective seating area 14 of the seat 12 is not enlarged. The internal flex member 160 and the external flex member 162 may include one or more flexible elements, such as those disclosed above with reference to FIGS. 5 and 5A.

Figure 13:
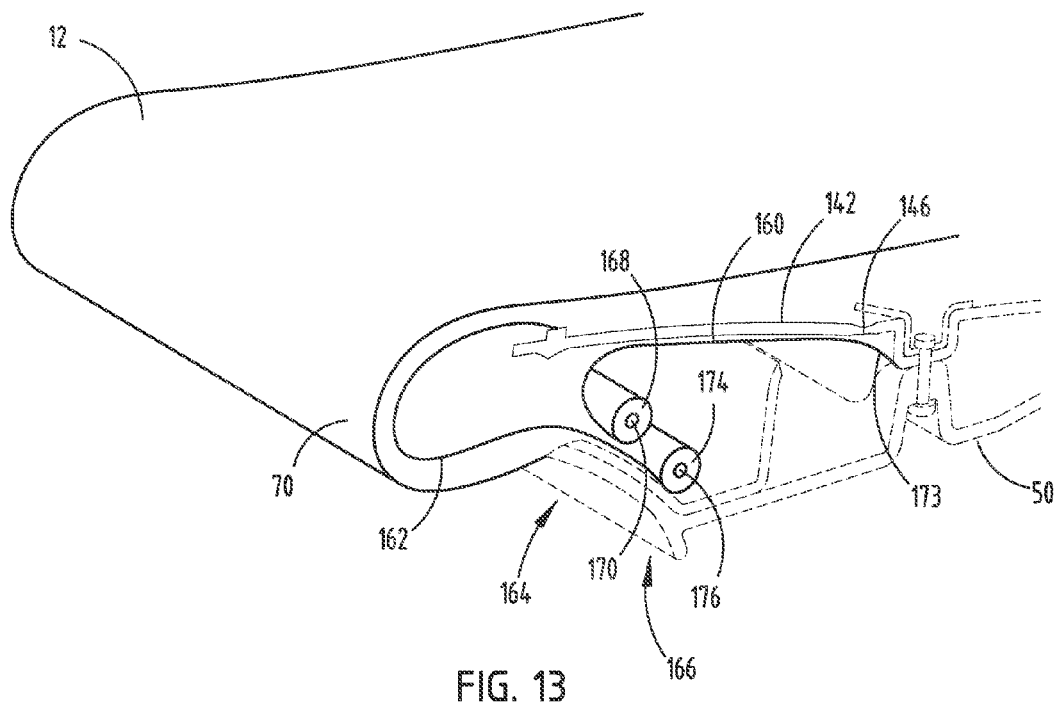
FIG. 13 is a top perspective view of another embodiment of a forward portion of a vehicle seating assembly of the present invention in an extended position.
Figure 13A:
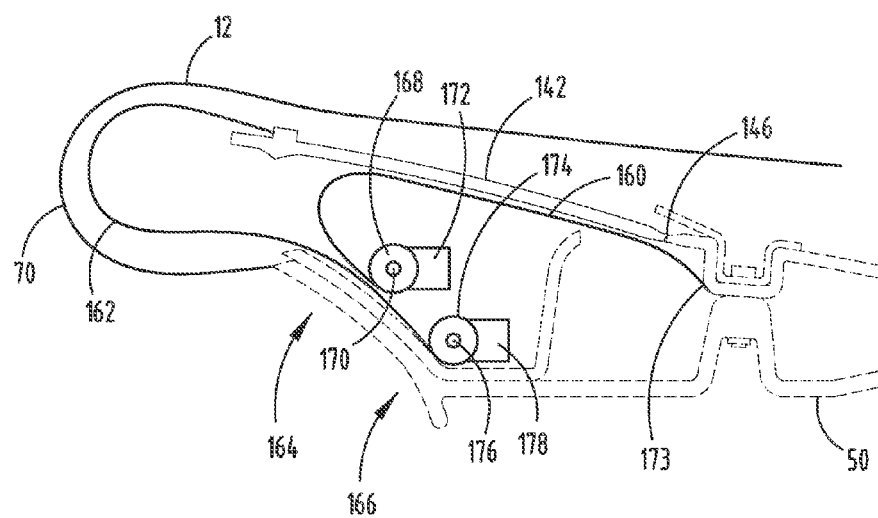
FIG. 13A is a side elevational view of the forward portion of the vehicle seating assembly of FIG. 13 in the extended position.

With reference to FIGS. 13 and 13A, the illustrated embodiment shows the first actuation assembly 164 having been activated to rotate the first roller 168 in a clockwise direction, thereby extending the internal flex member 160. As the internal flex member 160 is unwrapped from the first roller 168, the internal flex member 160 raises the lateral support member disposed in the seat 12. The lateral support member 142 is connected to the seat frame 50 via the living hinge 146, proximate the rearward portion 173 of the internal flex member 160. As forces are applied to the lateral support member 142, the forward portion 66 of the seat 12 is elevated. At the same time, the second actuation assembly 166 has been activated such that the second roller 174 is rotated clockwise to extend the external flex member 162. When the external flex member 162 extends, the forward portion 66 of the seat 12 is enlarged. As a result, more seating area 14 is provided to the driver or passenger. Regardless of the position of the seat 12, the external flex member 162 is hidden from view by the coverstock 70. The coverstock 70 may cover the external flex member 162 or wrap around the external flex member 162.

Figure 14:
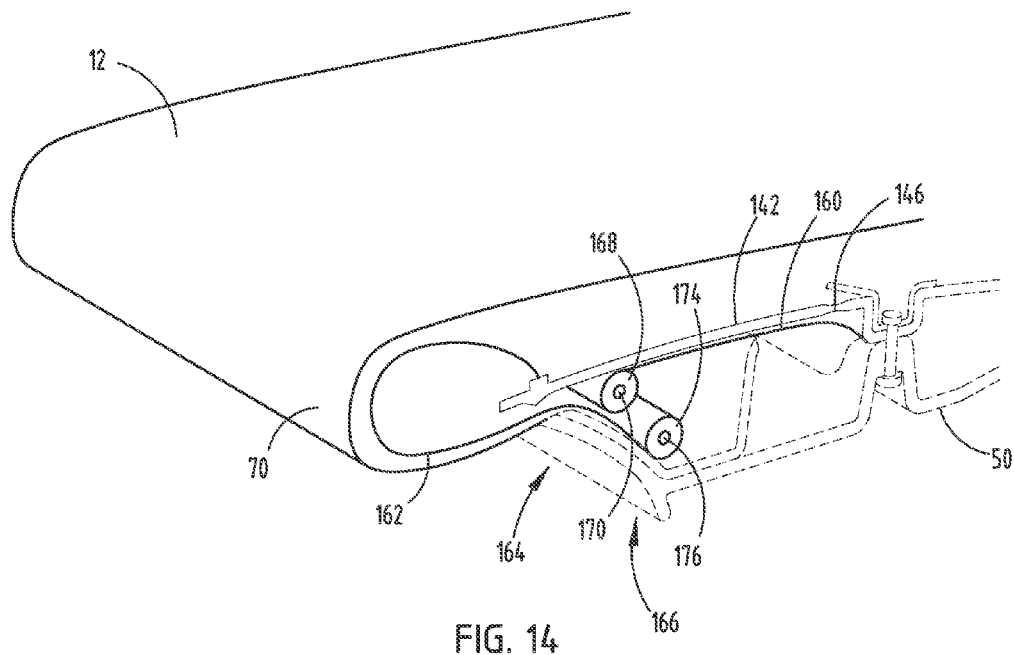
FIG. 14 is a top perspective view of another embodiment of a forward portion of a vehicle seating assembly of the present invention in a retracted position.
Figure 14A:
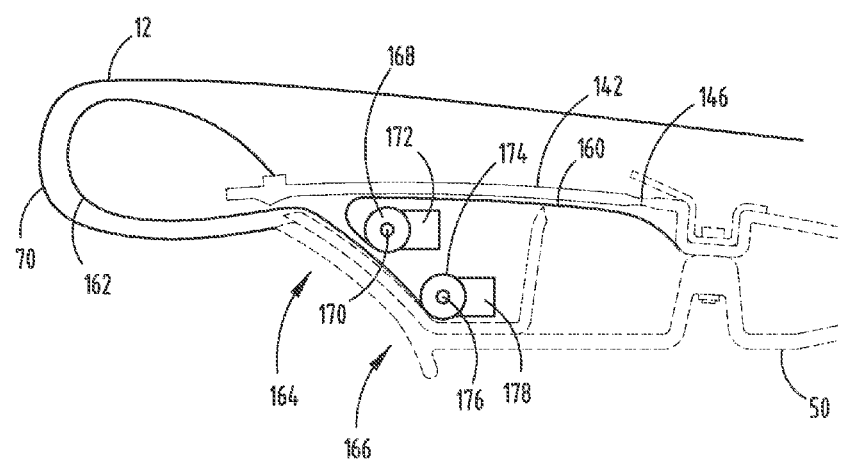
FIG. 14A is a side elevational view of the forward portion of the vehicle seating assembly of FIG. 14 in the retracted position.

Referring now to FIGS. 14 and 14A, the external flex member 162 is shown in the fully extended position, while the internal flex member 160 is shown in the lowered position. This particular configuration of the seat 12 is exemplary of the wide variety of potential positions a driver or passenger could choose. It is also contemplated that the driver or passenger could select the internal flex member 160 to be at the fully raised position, and that the external flex member 162 be in the fully retracted position. It will be understood by one having ordinary skill in the art that the actuation of the internal flex member 160 is independent of the actuation of the external flex member 162, such that a wide variety of positions are available to the driver or passenger.

Figure 15:
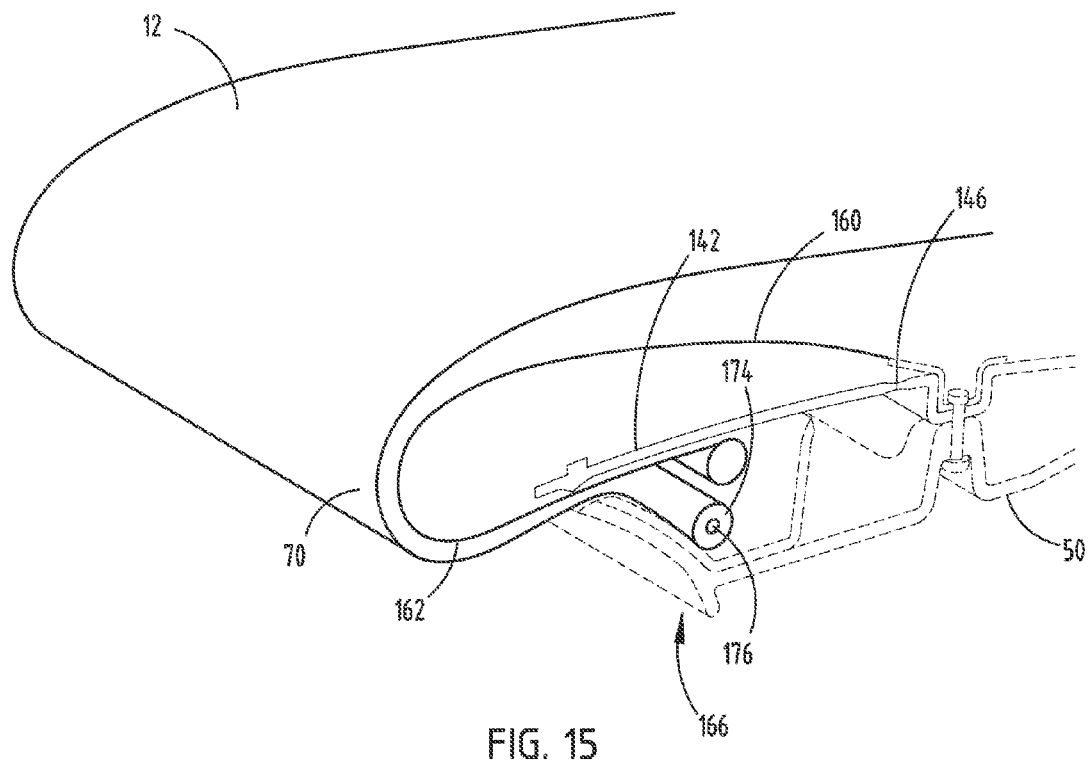
FIG. 15 is a top perspective view of another embodiment of a forward portion of a vehicle seating assembly of the present invention in an extended position.
Figure 15A:
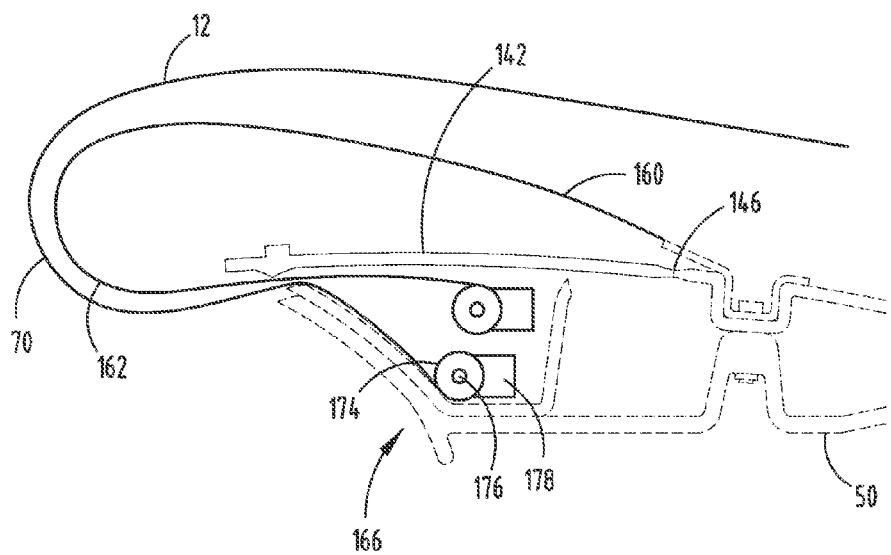
FIG. 15A is a side elevational view of the forward portion of the vehicle seating assembly of FIG. 15 in the extended position.

Referring now to FIGS. 15 and 15A, yet another embodiment of the vehicle seating assembly 10 is illustrated. Specifically, the external flex member 162 is arranged in a similar fashion to that disclosed above with reference to FIGS. 13-14A. However, the internal flex member 160 does not extend over the first roller 168 and the motor 172 to connect with the rearward portion 173 of the seat frame 50. Instead, the internal flex member 160 extends forward around the lateral support member 142 and connects to a top portion of the seat frame 50. In the illustrated embodiment, the internal flex member 160 connects with a forward extending flange 180 on a top portion of the seat frame 50. The embodiment illustrated in FIGS. 15 and 15A may be used to provide simultaneous movement of the seat 12 to the extended position and the raised position. Again, the actuation of the internal flex member 160 and the external flex member 162 are independent, such that a multitude of positions may be utilized by a driver or passenger.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:
1. A vehicle seat assembly, comprising:
   a seat defining a seating area and pivotally coupled with a seatback;
   a first flex member extending within an upper portion the seat;
   a second flex member extending within a forward portion of the seat;

a first actuation assembly having a first roller operably coupled to the first flex member to extend the first flex member and raise the upper portion of the seat; and a second actuation assembly having a second roller that translates the second flex member between a retracted position and an extended position that enlarges an effective seating area by extending it in a forward direction proximate the forward portion of the seat.

2. The vehicle seat assembly of claim 1, wherein the second flex member includes a flexible sheet section operably coupled with the second actuation assembly and a rigid base section pivotally coupled with the seat, and wherein the first flex member is released from the first actuation assembly to pivot the rigid base section of the second flex member upward.

3. The vehicle seat assembly of claim 1, wherein the second flex member is hidden from view by a coverstock.

4. The vehicle seat assembly of claim 3, wherein the coverstock wraps around the second flex member.

5. The vehicle seat assembly of claim 1, wherein the second flex member includes a plurality of elongate flexible elements.

6. The vehicle seat assembly of claim 5, wherein the plurality of elongate flexible elements are at least partially encased by a flexible sheet.

7. The vehicle seat assembly of claim 1, wherein the second flex member defines a forward edge of the seat.

8. The vehicle seat assembly of claim 1, wherein the first and second flex members each have a flexible sheet with a width extending laterally across the seat, and wherein the second flex member overlaps at least a portion of the first flex member.

9. The vehicle seat assembly of claim 1, wherein the second flexible member includes a plurality of flexible metal elements, each having an arcuate cross-section and extending longitudinally in the seat.

10. A vehicle seat assembly, comprising:
a seat;
an internal flex member wrapped around a first roller in the seat and unwrapping upon rotation of the first roller to raise an upper portion of the seat; and
an external flex member wrapped around a second roller in the seat and unwrapping upon rotation of the second roller to enlarge forwardly a forward portion of the seat.

11. The vehicle seat assembly of claim 10, wherein the seat includes a seat base panel pivotally coupled with a rear portion of the seat and spanning generally horizontally across a seating area of the seat, and wherein the internal flex member pivots the seat base panel upward as the internal flex member is unwrapped.

12. The vehicle seat assembly of claim 10, wherein the external flex member is hidden from view by a coverstock.

13. The vehicle seat assembly of claim 10, wherein the first and second rollers are each operably coupled with at least one motor that rotates to unwrap the respective internal and external flex members.

14. The vehicle seat assembly of claim 10, wherein the internal and external flex members each include a flexible sheet encasing the elongated elements.

15. The vehicle seat assembly of claim 14, wherein the external flex member overlaps at least a portion of the internal flex member.

16. A seat extension assembly, comprising:
a seat bottom defining a seating area;
an actuation assembly; and
first and second elongate flexible elements each extending lengthwise fore and aft and at least partially wrapped on first and second rollers, respectively, wherein the first elongate flexible element is released through rotation of the first roller by the actuation assembly to raise an upper portion of the seat bottom; and the second elongate flexible element is released through rotation of the second roller by the actuation assembly to extend the second elongate flexible element forwardly to enlarge the seating area of the seat bottom.

17. The seat extension assembly of claim 16, wherein the first and second elongate flexible elements are separately at least partially encased in a flexible sheet that spans across the seating area.

18. The seat extension assembly of claim 16, wherein the actuation assembly includes a motor operably coupled with at least one of the first and second rollers.

19. The seat extension assembly of claim 16, wherein the first and second elongate flexible elements include an arcuate cross-section taken transverse to a length of the elongate flexible elements.

20. The seat extension assembly of claim 16, further comprising:
a cushion support disposed at least partially between the first and second elongate flexible elements and a coverstock.

* * * * *